United States Patent [19]

Spies

[11] 4,356,848
[45] Nov. 2, 1982

[54] DISPENSER ASSEMBLY

[76] Inventor: Henry J. Spies, P.O. Box 424, Princeville-Hanalei, Kauai, Hi. 96714

[21] Appl. No.: 154,803

[22] Filed: May 30, 1980

[51] Int. Cl.³ .............................................. B65B 3/06
[52] U.S. Cl. .................................. 141/349; 141/321; 141/355; 141/362; 222/514
[58] Field of Search ...................... 141/2, 18, 319–322, 141/348–355, 360–366; 222/569, 514, 522, 525

[56] References Cited

U.S. PATENT DOCUMENTS

| | | | |
|---|---|---|---|
| 2,761,606 | 9/1956 | Pahl et al. | 141/354 |
| 2,907,489 | 10/1959 | Taylor | 222/569 X |
| 2,963,205 | 12/1960 | Beall, Jr. | 222/514 X |
| 3,072,299 | 1/1963 | Sessions et al. | 222/246 |
| 3,240,430 | 3/1966 | Diamond | 239/89 |
| 3,370,909 | 2/1968 | Schwartzman | 222/501 |
| 3,402,747 | 9/1968 | Tissot-Dupont | 141/348 |
| 3,885,608 | 5/1975 | Ayres | 141/354 |
| 4,026,336 | 5/1977 | Spies | 141/348 |

Primary Examiner—Frederick R. Schmidt

Attorney, Agent, or Firm—John E. Reilly

[57] ABSTRACT

A dispenser assembly has been devised for the transfer of flowable materials from one container to another and is characterized in particular by the construction of a dispenser spout which is adapted to be releasably secured to a tubular extension projecting from the access opening of the supply container. The spout is comprised of an end closure having an open support adapted to be releasably inserted into the tubular extension such that the closure is spaced from the end of the tubular extension and the open support permits the passage of materials from the supply container. A movable sleeve in telescoping relation to the tubular extension is normally urged in a direction closing the passage formed by the open support outwardly of the tubular extension. When the spout is inserted into an access opening for a container to be filled, the movable sleeve is engaged by the surrounding edge of the access opening and retracted in a direction to open the passage for escape of material from the supply container into the container to be filled.

20 Claims, 7 Drawing Figures

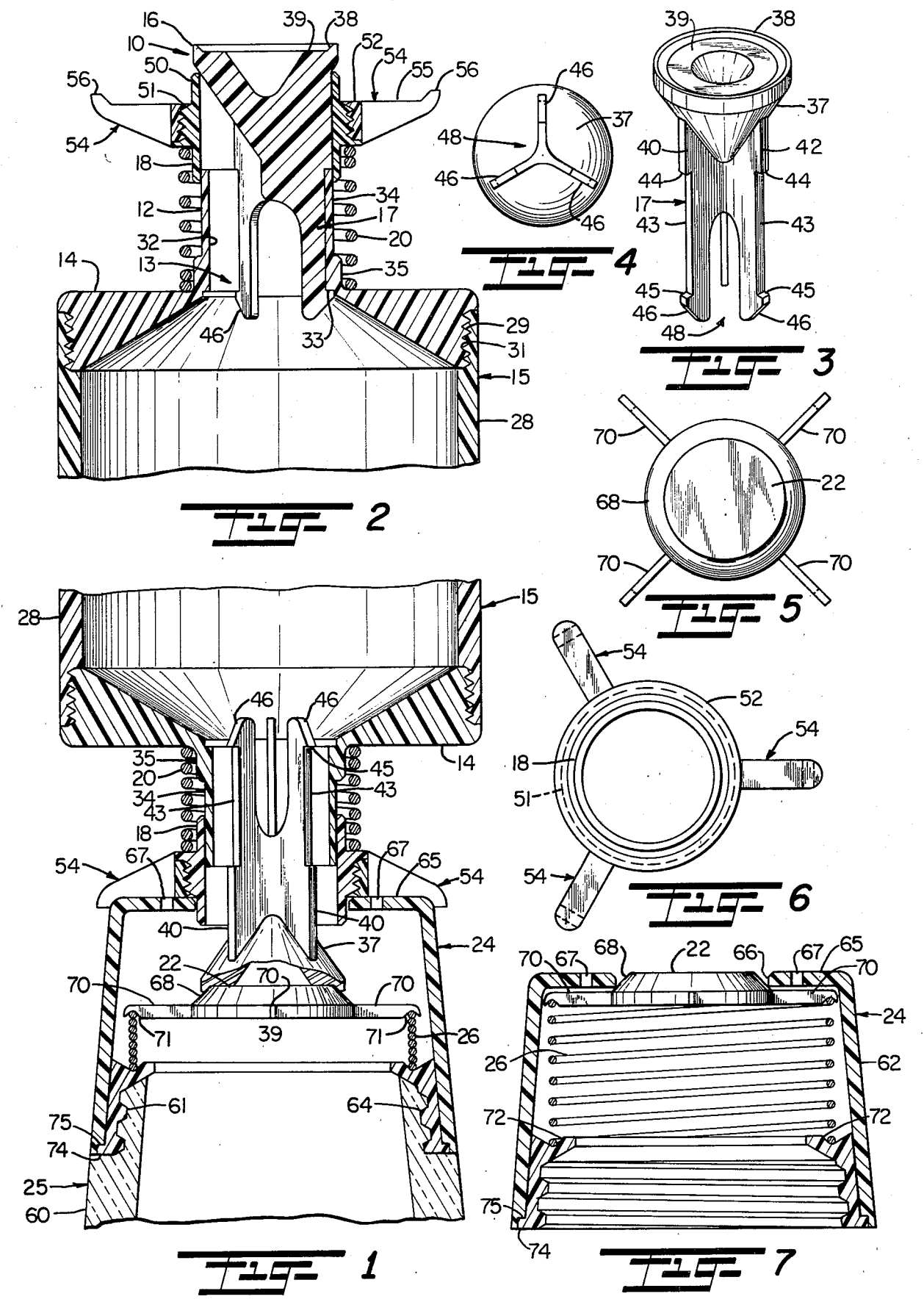

DISPENSER ASSEMBLY

This invention relates to dispensers and more particularly relates to a novel and improved form of dispenser spout assembly for isolated transfer of flowable materials from one container to another.

BACKGROUND AND FIELD OF THE INVENTION

My prior U.S. Pat. No. 4,026,336 is directed to a dispensing apparatus which is adaptable for use in permitting the isolated transfer of flowable materials between a supply container and a container to be filled and specifically in a manner which will permit sealed isolation of the materials in the supply or storage container both during transfer and when not in use. For instance, by way of illustration, that invention as well as the present invention is specifically adaptable for use in the dispensing of granular or powdered materials, such as, salt, pepper, sugar, flour and the like from a supply container into a number of shakers or small containers by the simple expedient of inserting the dispenser spout through the normally closed access opening of the shaker so as to simultaneously open the dispenser spout for flow of the materials from the supply container into the container to be filled. The subject of my prior patent is presently in commercial use and, briefly, discloses the utilization of a neck or spout on one container which matingly cooperates with an opening in the receiving container to establish externally isolated flow, the container with the pouring spout attached thereto being cooperative with a spring-loaded cap or other normally closed access opening in the other container. The neck or spout assembly is broadly comprised of telescoping or concentrically positioned, elongated hollow members, the inner member being stationary and having a closed outer end with at least one port or orifice through the sidewall near the closed end. The closed end has a wedge portion with inwardly directed, sloping surfaces for deflecting material flow into the ports. The other end of the inner member may be secured for extension into an existing opening in the container so that the interior of the container is in open communication through the port. The other elongated hollow member is slidable over the stationary member so as to be positioned in normally closed relation to the port, such as, by the urging of a spring or other biasing element and includes a stop for preventing further travel once the port closing position is obtained. Still another elongated hollow member can be attached in fixed relation to the stationary member as a shroud which forms a cylindrical chamber between it and the inner member for retaining the spring element as well as to provide an outer extension stop for the slidable member. The other container has an opening through one wall sized for passage of the inner hollow member on the neck or spout assembly while blocking passage of the outer sliding hollow member. The container to be filled also may include an internally mounted plug across the access opening which can be urged to an open position, for instance, when the dispensing spout is inserted through the access opening.

Numerous other devices employ some form of a movable or retractable sleeve which is spring-loaded and can be depressed by engagement with a container to be filled so as to open supply ports for transfer of material from one container to another. Representative of such devices are disclosed in U.S. patent to Pahl et al. U.S. Pat. No. 2,761,606, Sessions et al. U.S. Pat. No. 3,072,299, Diamond U.S. Pat. No. 3,240,430, Berning et al. U.S. Pat. No. 3,307,595, Schwartzman U.S. Pat. No. 3,370,909, Kajita U.S. Pat. No. 3,373,776, Tissot-Dupont U.S. Pat. No. 3,402,747, Leeds U.S. Pat. No. 3,476,507, Nigro U.S. Pat. No. 3,680,605 and Ayres U.S. Pat. No. 3,885,608. Still other representative patents are discussed in my hereinbefore U.S. Pat. No. 4,026,336.

It is highly desirable to provide for a dispenser spout which is of simplified construction and is usable on existing supply containers or can be easily retrofit for isolated transfer of flowable materials between containers, and will operate to seal the supply container when not in use; yet is capable of automatically sealing both containers during transfer of materials therebetween so as to greatly minimize contamination or loss due to spillage.

SUMMARY OF THE INVENTION

It is therefore an object of the present invention to provide for a novel and improved dispenser assembly which requires a minimum number of parts, is of simplified construction and easy to assemble for use in the isolated or externally sealed content transferral between containers.

It is another object of the present invention to provide for a low profile, dispenser spout assembly conformable for use with various types of supply or bulk storage containers in order to seal the contents of the container when not in use and to facilitate sealed transfer of materials from the supply container to another container to be filled.

It is a further object of the present invention to provide in a dispenser spout assembly for a novel and improved means of detachably mounting a dispenser spout within an access opening on a supply or storage container.

It is an additional object of the present invention to provide for a novel and improved form of dispenser spout assembly which is conformable for use in combination with numerous types of containers to be filled but is specifically adaptable for use with depressable closures formed on an end cap of the container to be filled so as to effect isolated transferral of materials between containers in a dependable and highly efficient manner.

In accordance with the present invention there has been devised a novel and improved form of dispenser spout assembly which is adapted for selectively controlling the passage of flowable materials from a container and the like in which the container is provided with a generally tubular extension projecting from communication with the interior of the container. The dispenser spout assembly can be detachably mounted by means of an open support member which is defined by one or more elongated support members or ribs adapted for close-fitting insertion through the tubular extension with the ribs terminating in radially outwardly directed extremities or latches at one end which are engageable with the inner end of the tubular extension within the container. A conical closure at the end of the open support opposite to the latching end is disposed in axially spaced relation to the open end of the extension, and a movable sleeve is disposed in telescoping relation to the tubular extension and is spring-loaded or otherwise biased in a direction to abut the closure and close the open space formed between the open end of the tubular extension and closure so as to normally seal and prevent the release of materials from the supply container; however upon application of pressure to the sleeve in a direction to overcome the urging of the spring or other biasing element, the sleeve will be retracted away from the open space for release of material from the supply container into another container.

The preferred form of dispenser assembly is particularly useful in combination with a second container provided with a spring-loaded closure across the access opening of the container whereupon insertion of the closure of the dispensing spout into the access opening of the second container, the spring-loaded closure will be depressed against the urging of its spring to permit passage of the flowable material from the supply container into the container to be filled. In this relation, an improved disposition and mounting of the spring-loaded closure is provided by positioning the spring in outer spaced concentric relation to the access opening and forming a radial extension on the closure to serve as a spring seating surface so that the spring is not in the path of flow of materials into the container to be filled and is better capable of maintaining proper centered relation between the valve and access opening.

Other objects, advantages and features of the present invention will become more readily appreciated and understood from a consideration of the following detailed description of a preferred form of the present invention when taken together with the accompanying drawings, in which:

BRIEF DESCRIPTION OF THE DRAWINGS

FIG. 1 is an assembly view partially in section and broken to illustrate the interrelationship between the preferred form of dispenser spout and container to be filled in accordance with the present invention;

FIG. 2 is a view partially in section illustrating the preferred form of dispenser spout in accordance with the present invention;

FIG. 3 is a somewhat perspective view of the preferred form of end closure and support forming a part of the preferred form of dispenser spout;

FIG. 4 is an end view of the part illustrated in FIG. 3;

FIG. 5 is a top plan view of the dispenser spout shown in FIGS. 1 and 2;

FIG. 6 is a top plan view of a preferred form of closure element for a container to be filled; and FIG. 7 is a view partially in section of the closure for a container to be filled as shown in FIG. 6 and usable in combination with the dispenser spout of the present invention.

DETAILED DESCRIPTION OF THE PREFERRED EMBODIMENT

As illustrated in FIGS. 1 and 2, the preferred form of invention is broadly comprised of a dispenser spout designated at 10 which is adapted to be detachably mounted to a tubular extension 12 projecting from an access opening 13 formed in cover 14 of a supply container 15. The dispenser spout 10 comprises an end closure 16 and an elongated open support 17 which is directed axially away from the end closure for insertion into the tubular extension 12; and a movable sleeve 18 is disposed in telescoping relation to the tubular extension 12 and is biased by spring element 20 in a direction to form a closure across the open space around the support between the tubular extension 12 and end closure 16. When the supply container 15 is inverted, as illustrated in FIG. 2, the end closure 16 can be brought into alignment with a valve element 22 such that the movable sleeve 18 is engageable with the top of end cap 24 on the container to be filled which is represented at 25. Downward pressure exerted against the valve 22 to overcome the loading of its spring 26 will cause the movable sleeve 18 to be retracted against the urging of the spring 20 so as to clear the open space formed between the extension 12 and end closure 16 for the sealed transfer of material from the supply container 15 into the container 25. As a setting for the present invention, the material in the supply container 15 is merely intended to be released by gravity flow by inverting the container in the manner described and inserting it into the container to be filled as represented at 25. It will be apparent however that the contents of the container 15 may be pressurized so as to positively force the contents from the container into the container to be filled without necessity of inverting the container; or material may be transferred from another container into the supply container by retracting the movable sleeve in the manner described and causing material to be transferred through the open space and tubular extension into the supply container.

Referring in more detail to FIGS. 1 and 2, the dispenser spout 10 of the present invention lends itself particularly well to utilization with a supply container of the type illustrated in FIGS. 1 and 2 wherein the supply container 15 has a generally cylindrical wall 28 terminating at one end in an internally threaded edge 29 which is adapted to receive the flat cover 14, the flat cover 14 having an externally threaded extension 31 adapted to mate with the threading 29 at the end of the container 15. The flat cover 14 is provided with central access opening 13, and the tubular extension 12 has an inner wall 32 of uniform diameter which terminates at its inner end in an outwardly stepped shoulder 33, the tubular extension establishing communication with the interior of the container 15. In addition, the external surface 34 of the tubular extension terminates in a shoulder or thickened portion 35 at its base or point of connection into the cover 14.

In the preferred form of dispenser spout 10, the end closure 16 is of generally conical configuration so as to define an outwardly flaring or divergent external surface 37 which terminates in an outer ridge 38 in surrounding relation to a flat annular seating surface 39, as best seen from FIG 3. The open support member 17 is defined by a series of radially extending ribs or legs 40 which are arranged at equally spaced circumferential intervals and extend in an axial direction away from the divergent surface 37 of the end closure 16. The ribs have forward or outer end surfaces which are tapered or inclined to conform to the conical configuration of the external surface 37 and the ribs may be formed either as a unitary or integral part of the end closure or be permanently affixed thereto. In the preferred form there are a series of three ribs 40 at equally spaced circumferential intervals, the ribs 40 being joined together at their centers and having outer edges 42 dimensioned to be of a length greater than the length of the tubular extension 12. Each outer edge 42 of a rib 40 is formed with a notched surface 43 of a length corresponding to the length of the tubular extension so as to form shoulders 44 and 45 at opposite ends of the notched surface, and the inner or rearward extremity of each rib having a beveled end surface 46. Moreover, the ribs are formed with a common or central recessed area 48 along their rearward or inner ends so that the inner ends of the ribs are capable of being compressed inwardly to a slight degree necessary for insertion through the tubular extension until their inner shoulders 45 clear the inner end of the tubular extension and are free to spring outwardly into engagement with the shoulder 33. In turn, the outer shoulders 44 will engage the outer extremity of the tubular extension so that the spout is retained in snapfit relation to the tubular extension with the end closure spaced axially from the outer end of the tubular extension. In this way, the inner shoulders 45 effectively form spring-loaded latch elements for the purpose of effecting positive but releasable attachment to the extension 12.

The movable sleeve 18 forms a sealing member which is preferably disposed in outer telescoping relation to the tubular extension 12, the sleeve being of a length to extend from overlapping relation to the outer end of the tubular extension 12 into abutting relation to the external surface 37 of the end closure, as illustrated in FIG. 1. The sleeve has a radially extending rim or ledge 50 which is externally threaded as at 51 and adapted to receive a securing ring 52 for a series of radially outwardly extending prongs 54. Each prong has a forward, relatively flat seating surface 55 and a forwardly inclined outward radial tip 56. The movable sleeve 18 is yieldingly urged into the closed relationship as described by the coiled tension spring 20 which is interpositioned between the cover 14 and inner end of the rim 50. As will become hereinafter more apparent, the movable sleeve may be used with equal facility without the prong-like elements 54 in that the rim 50 is sized to engage the surrounding edge of the access opening of the container to be filled so as to depress the movable sleeve away from the closed position and to retract it along the outer surface of the tubular extension 12 against the urging of the spring element 20 into the compressed position as shown in FIG. 2. In this relation, the prongs 54 merely aid in establishing engagement with a particular configuration of cap 24 for the container 25 with the tips 56 conforming to the configuration of the curved outer edges of the cap 24.

In the form illustrated in FIG. 1, the container 25 is intended to represent a conventional form of salt or pepper shaker having a convergent wall 60 extending upwardly from a lower closed end or base, not shown, and the wall portion 60 terminating in an upper, externally threaded extension 61. The cap 24 has an upwardly convergent wall 62 adapted to form a continuation of the external surface of the wall 60 and is provided with a separate, internally threaded port 64 at its lower open end which is adapted to mate with the externally threaded extension 61. The wall 62 of the cap terminates in an upper flat top 65 provided with a central access opening 66. A series of apertures represented at 67 are formed at spaced intervals in the top 65 for the purpose of shaking or releasing the contents of the shaker in a well-known manner. However, the central opening 66 is normally closed by the valve or plug element 22 which is of a configuration corresponding to that of the central opening 66 but of a size just greater than that of the opening and provided with a beveled end surface 68 which is adapted to move into closed or seated relation to the surrounding edge of the opening 66, as shown in FIG. 7. The plug 22 is provided with radially extending arms 70 at spaced circumferential intervals, as illustrated in FIG. 6, and which extend to a point of termination just within the inner wall of the cap 24. The underside of each arm 70 is provided with a notched area 71 to receive the end of the coil spring element 26; in turn, the upper surface of the internally threaded part 64 is provided with an annular notched surface area 72 to receive the lower end of the spring 26. In this manner, the spring is arranged in outer spaced concentric relation to the central opening 66 and along the inner wall of the cap so as to be well out of the way of the passage of contents from the supply container into the shaker. Further, by positioning the spring at a point removed or spaced from the central plug 22, it will lend substantially more stability to the plug 22 and maintain it in properly centered relation to the opening 66. In the relationship shown in FIG. 2, the configuration of the beveled end 68 of the plug 22 is such as to be complementary to that of the outer end of the closure 16 of the dispenser spout so that the closure may be firmly seated against the beveled end of the plug as a preliminary to depressing the plug 22 inwardly away from the opening for dispensing the contents of the container 15 into the shaker. When a downward pressure is removed from the dispensing spout at the completion of the filling operation and the spout removed from the cap, the plug will immediately be returned to its closed position under the urging of the spring 26.

Preferably, the internally threaded port 64 is properly seated within the cap 24 by forming a lip 74 around the lower edge of the port and which fits into a recess 75 in the lower edge of the wall 62. The port 64 is permanently affixed to the cap by a suitable bonding agent.

From the foregoing, it will be appreciated that a greatly simplified dispenser spout attachment has been devised which can be easily assembled in place within a tubular extension on a container simply by pressing the lower beveled end surfaces 46 of the ribs downwardly against the open end of the tubular extension 12 so as to compress the ribs inwardly and permit them to be advanced into the latched relationship as shown. By virtue of the novel combination and arrangement of elements, the spout may be extremely low profile and project but a limited distance away from the cover of the supply container. As it is shown, the dispenser spout is conformable for use with a flat cover 14 so as to permit complete filling of the container 15 since none of the elements of the dispenser spout need project into the supply container. If it is desired to remove the spout, such as, for cleaning purposes, it is necessary only to remove the cover and to press the inner latching portion 45 inwardly to clear the inner wall surface 32 of the tubular extension and to force outwardly therethrough. While the conical end surface 37 is shown as defining a generally wedge-shaped surface to facilitate removal of the contents from the interior of the container, it will be apparent that the degree of divergency may vary depending upon the relative proportioning between elements. Most desirably however the closure is dimensioned to have an external diameter corresponding to the external diameter of the sleeve 18 proper, and the effective circumference of the open support 17 corresponds to the circumference of the external wall 34 of the tubular extension.

The various elements comprising the dispenser spout may be fabricated preferably from metal or plastic compositions with the exception of the coiled springs which most desirably are composed of metal. In any event, the ribs 17 are composed of a material which possesses some limited resiliency so that they are capable of being compressed inwardly along their lower legs which bound or flank the recessed area 48 for pressfit insertion into the tubular extension 12. The ease and simplicity with which the entire dispenser spout can be assembled will be readily apparent in that it is merely necessary to place the spring element 20 over the tubular extension 12, depress the spring 20 so as to permit the movable sleeve 18 to be placed over the tubular extension 12, then to force the open support 17 inside the tubular extension 12 until it is properly seated within the access opening. As illustrated in FIG. 1, when the dispenser spout is inverted and inserted into the end cap 24, the prong elements may be firmly seated against the top surface of the end cap. If desired, however, the length of the threaded portion 51 may be increased so that the prongs are spaced rearwardly of the leading end of the threaded portion 51 and, in this way, be spaced above the end cap 24 and not move into engagement with the end cap when the spout is inserted into the shaker. This is helpful, for instance, where the operator may prefer to insert the spout into the shaker top at somewhat of an angle to facilitate removal or transfer of material through the spout. Furthermore, the prongs can serve as adapters so that in the event it is desired to inject or transfer materials into another container having an enlarged opening, i.e., an opening substantially larger than the outer diameter of the movable sleeve 18, the adapter prongs 54 will engage the surrounding edge of the opening to depress the movable sleeve for removal of the contents.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

I claim:

1. In a dispenser apparatus adapted for controlling the passage of flowable material from a container wherein said container includes a generally tubular member projecting outwardly from said container with the inner surface of said tubular member in communication with the interior of said container and said tubular member terminating in an open end, the improvement comprising:
   a dispenser spout coupled to said tubular member including an end closure open support means mounting said end closure in coaxial, spaced relation to said open end of said tubular whereby to define a continuous open space between said end closure and the interior of said container which is bounded by said tubular member so that said inner surface of said tubular member remains in direct communication with the interior of said container; and
   a sealing member in the form of a movable sleeve disposed in telescoping relation to said tubular member for movement between a closed position covering the open space between the open end of said tubular member and said end closure and an open position retracted away from said end closure so as to uncover the open space between said end closure and the open end of said tubular member, and bias means engageable with said sealing member and operative to normally urge said sealing member into the closed position.

2. In a dispenser apparatus according to claim 1, said open support means defined by an elongated member extending in an axial direction away from one end of said end closure in facing relation to the open end of said tubular member, said elongated member being dimensioned for insertion in close-fitting relation into said tubular member.

3. In a dispenser apparatus according to claim 2, said elongated member including latching means adapted to releasably couple said elongated member in predetermined relation to said tubular member such that said end closure is disposed in axially spaced relation to the open end of said tubular member.

4. In a dispenser apparatus according to claim 1, said open support means defined by a plurality of longitudinally extending ribs extending symmetrically about a longitudinal axis through said tubular member, said ribs being dimensioned for close-fitting insertion into said tubular member.

5. In a dispenser apparatus according to claim 4, said ribs provided with yieldable latch members at their inner ends adapted to be releasably coupled to the inner end of said tubular member.

6. In a dispenser apparatus according to claim 1, said open support means defined by a plurality of resilient legs extending from said end closure member for insertion into snap-fitting relation to the inner end of said tubular member.

7. In a dispenser apparatus according to claim 6, said resilient legs provided with latch portions at their inner ends for releasably engaging the inner end of said tubular member.

8. In a dispenser apparatus according to claim 6, said end closure being of generally conical configuration to form a conical end surface in facing relation to the open end of said tubular member, and said resilient legs being in the form of ribs affixed to the conical end surface of said end closure, said ribs having an effective circumference less than the circumference of said end closure.

9. In a dispenser apparatus according to claim 8, said sealing member defined by a movable sleeve disposed in outer concentric relation to said tubular member and said bias means disposed in surrounding relation to said tubular member between said container and said sleeve.

10. In a dispenser apparatus according to claim 9, said movable sleeve provided with retracting means in the form of radially extending arms arranged at spaced circumferential intervals thereon.

11. In a dispenser apparatus according to claim 10, said retracting means including a ring to which said radially extending arms are attached, said ring being releasably positioned on said movable sleeve.

12. In a dispenser apparatus according to claim 11, said movable sleeve having an externally threaded portion for threaded connection with mating internal threads on said ring.

13. In a dispenser apparatus according to claim 9, said end closure having a conical end surface in facing relation to said tubular member and a flat annular seating surface facing away from said tubular member.

14. In a dispenser apparatus adapted for controlling the passage of flowable material between a first supply container and a second container to be filled, said second container provided with an access opening and a valve element positioned in said access opening and operative to normally close said access opening and said first container includes a generally tubular member projecting outwardly from said first container with its inner surface in communication with the interior of said first container, the improvement comprising:

a dispenser spout coupled to said tubular member including an end closure dimensioned for insertion through the access opening in said second container to depress said valve element away from said access opening, open support means detachably mounting said end closure in coaxial, spaced relation to said open end of said tubular member whereby to define a continuous open space between said end closure and the interior of said container which is bounded by said tubular member so that said inner surface of said tubular member remains in communication with the interior of said first container; and a sealing member in the form of a movable sleeve disposed in outer telescoping relation to said tubular member for movement between a closed position covering the open space between the open end of said tubular member and said end closure, and an open position retracted away from said end closure so as to uncover the open space between said end closure and the open end of said tubular member, bias means engageable with said sealing member and operative to normally urge said sealing member into the closed position, and retracting means on said sealing member engageable with said second container when said end closure is inserted through the access opening of said second container so as to overcome the urging of said bias means and cause movement of said sealing member toward the open position whereby to permit transfer of materials between said first and second container.

15. In a dispenser apparatus according to claim 14, said open support means defined by elongated ribs extending in an axial direction away from one end of said end closure in facing relation to the open end of said tubular member said ribs dimensioned for insertion in close-fitting relation into said tubular member, said ribs provided with yieldable latch members at their inner ends adapted to be releasably coupled to the inner end of said tubular member.

16. In a dispenser apparatus according to claim 15, said ribs having resilient legs provided with latch portions at their inner ends for releasably engaging the inner end of said tubular member.

17. In a dispenser apparatus according to claim 16, said end closure being of generally conical configuration to form a conical end surface in facing relation to the open end of said tubular member, and said ribs affixed to the conical end surface of said end closure, said ribs having an effective circumference less than the circumference of said end closure.

18. In a dispenser apparatus according to claim 14, said sealing member defined by a movable sleeve disposed in outer concentric relation to said tubular member and said bias means disposed in surrounding relation to said tubular member between said first container and said sleeve, said movable sleeve provided with retracting means in the form of radially extending arms arranged at spaced circumferential intervals thereon.

19. In a dispenser apparatus according to claim 14, said valve element having a radially outwardly extending portion disposed within said second container, a resilient means engageable with said radially outwardly extending portion in outer spaced concentric relation to said access opening to urge said valve element in a direction closing said access opening.

20. In a dispenser apparatus according to claim 19, said container having an end cap provided with said access opening therein, said end cap having an internally threaded portion and said radially outwardly extending portion provided with aligned end stops in facing relation to one another, and said resilient means being in the form of a coiled spring interposed under compression between said aligned end stops.

* * * * *

UNITED STATES PATENT AND TRADEMARK OFFICE
CERTIFICATE OF CORRECTION

PATENT NO. : 4,356,848
DATED : November 2, 1982
INVENTOR(S) : Henry J. Spies

It is certified that error appears in the above—identified patent and that said Letters Patent is hereby corrected as shown below:

Column 2, line 1, after "al" delete -- . --.
Column 2, line 4, after "al" delete -- . --.

In the Claims:

Claim 1, Column 7, line 47, after "closure" add -- , --.
Claim 1, Column 7, line 49, after "tubular" add -- member --.

Signed and Sealed this

Twenty-ninth Day of March 1983

[SEAL]

Attest:

GERALD J. MOSSINGHOFF

Attesting Officer

Commissioner of Patents and Trademarks